(12) United States Patent
Reid (10) Patent No.: US 7,787,000 B2
(45) Date of Patent: Aug. 31, 2010

(54) EXPOSURE ADJUSTMENT OF AN IMAGE USING G+/G− CURVE

(75) Inventor: Russell M. Reid, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 1241 days.

(21) Appl. No.: 11/325,168

(22) Filed: Jan. 3, 2006

(65) Prior Publication Data

US 2007/0153305 A1   Jul. 5, 2007

(51) Int. Cl.
  *G09G 5/02* (2006.01)
(52) U.S. Cl. .................. 345/589; 345/581; 345/617
(58) Field of Classification Search ............. 345/72, 345/77, 589, 590; 382/274
  See application file for complete search history.

(56) References Cited

U.S. PATENT DOCUMENTS 5,473,373 A * 12/1995 Hwung et al. ............... 348/254

| | | | |
|---|---|---|---|
| 6,603,104 B1 * | 8/2003 | Lee ........................... 250/205 |
| 6,700,561 B1 * | 3/2004 | Christensen et al. ......... 345/97 |
| 7,286,131 B2 * | 10/2007 | Brodie et al. ............... 345/442 |
| 7,372,597 B2 * | 5/2008 | Topfer et al. ................ 358/1.9 |

OTHER PUBLICATIONS

Koren, N., "Making fine prints in your digital darkroom Monitor calibration and gamma" retrieved on Mar. 7, 2006 from the Internet <URL: http://www.normankoren.com/makingfineprints1A.html>.

* cited by examiner

*Primary Examiner*—Michelle K Lay
(74) *Attorney, Agent, or Firm*—Hickman Palermo Truong & Becker LLP; Daniel D. Ledesma (57) ABSTRACT

An improved exposure adjustment technique for brightening and darkening an image using a modified Gamma-like (G+) function is provided. The G+ function possesses characteristics such that, when applied brightening an image, the darker pixels are not enhanced too quickly when brightening, and the lighter pixels are not decreased too quickly when darkening. Two pertinent characteristics include the fact that the slope of the G+ function is not infinite at the origin, where "origin" corresponds to black pixels, and the slope near the origin, where corresponding to pixels are relatively dark, is lower than the slope of a conventional Gamma-like function.

30 Claims, 9 Drawing Sheets

EXPOSURE ADJUSTMENT OF AN IMAGE USING G+/G− CURVE

FIELD OF THE INVENTION

The present invention relates generally to digital image processing and, more specifically, to techniques for adjusting the brightness of an image using a modified Gamma-like function.

BACKGROUND OF THE INVENTION

The techniques described in this section are techniques that could be pursued, but not necessarily techniques that have been previously conceived or pursued. Therefore, unless otherwise indicated, it should not be assumed that any of the techniques described in this section qualify as prior art merely by virtue of their inclusion in this section.

Adjusting the exposure of an image is a common image processing action. Most people are familiar with adjusting the brightness of their computer monitor. A computer monitor is made up of potentially millions of pixels. A pixel is the basic unit of the composition of an image on a television screen, computer monitor, or similar display. When a user adjusts the brightness of a CRT monitor or LCD screen, or of an image using image processing software, the user is adjusting each pixel according to a certain function. For example, an image may be brightened by adding a certain constant value, based on user input, to the values that represent each pixel in the image.

A function that is used to brighten pixels is referred to herein as a "brightening function". Because pixels have a limit on how exposed (i.e. white) they can be, all hardware has a fixed maximum value for the data that represents the pixels. This physical limit is why a simple addition to all pixels in an image could not work, unless any values that exceeded the hardware limit were capped off. A simple addition has significant undesirable effects on an image, such as altering the truly black pixels and causing non-white pixels to become white.

Figure 1:
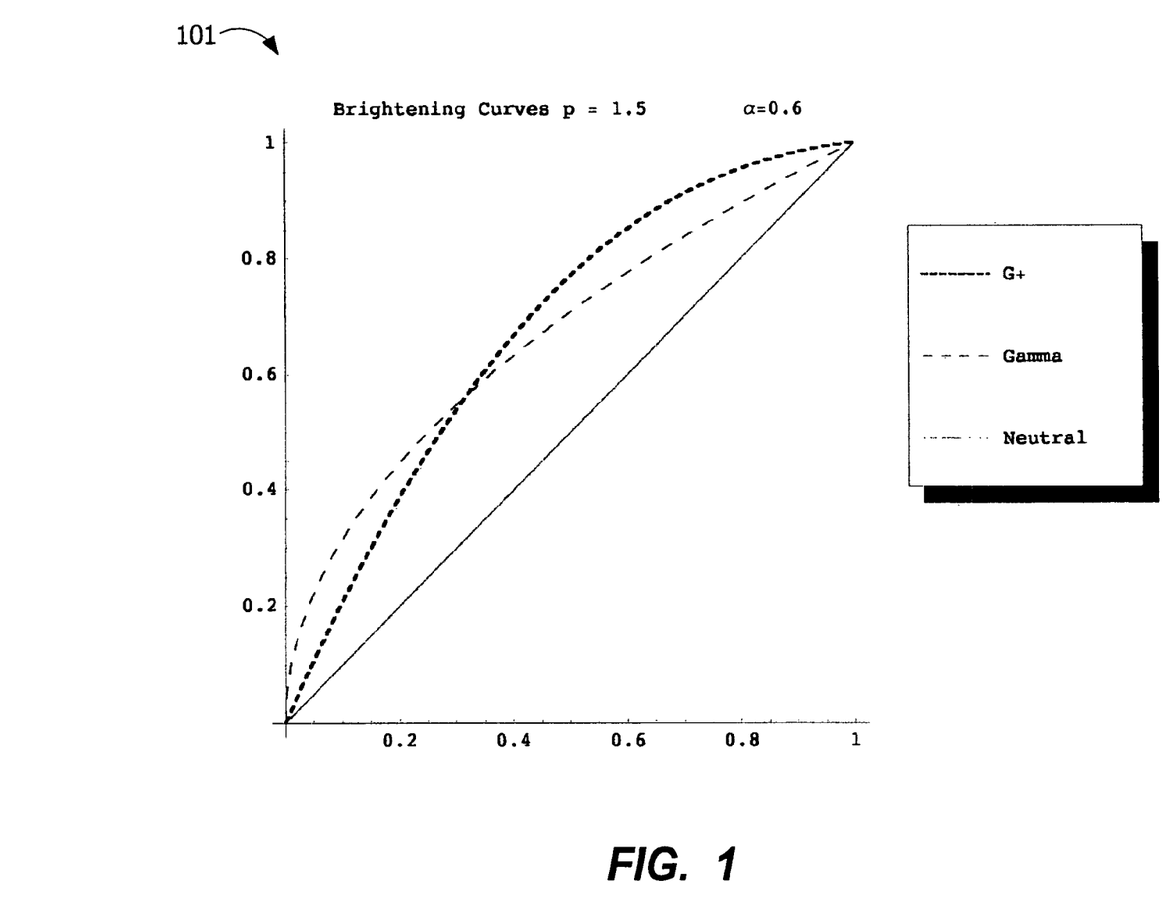
FIG. 1 is a graph that illustrates the curve generated by the modified Gamma-like (G+) function compared to the curve of a conventional Gamma-like function, according to an embodiment of the invention.

A conventional Gamma-like function is commonly used to alter the brightness of an image to avoid this problem of brightening black pixels that are suppose to remain black and causing too many pixels to become white, which would cause the lose of much detail. The significant properties of a curve produced by a conventional Gamma-like function are (1) an infinite slope at the origin (where the brightness of a pixel is zero), and (2) a uniform bulbous characteristic in the lower to middle of the range of possible brightness values. The infinite slope and bulbous characteristic properties are a result of a power or square root term in the Gamma-like formula. For instance, FIG. 1 illustrates a graph 101 that shows a curve ("Gamma") generated by a conventional Gamma-like function. The slope of Gamma is infinite at the origin and the curve "bulbs out" in the lower to middle range of the dark side of the brightness spectrum.

Figure 4A:
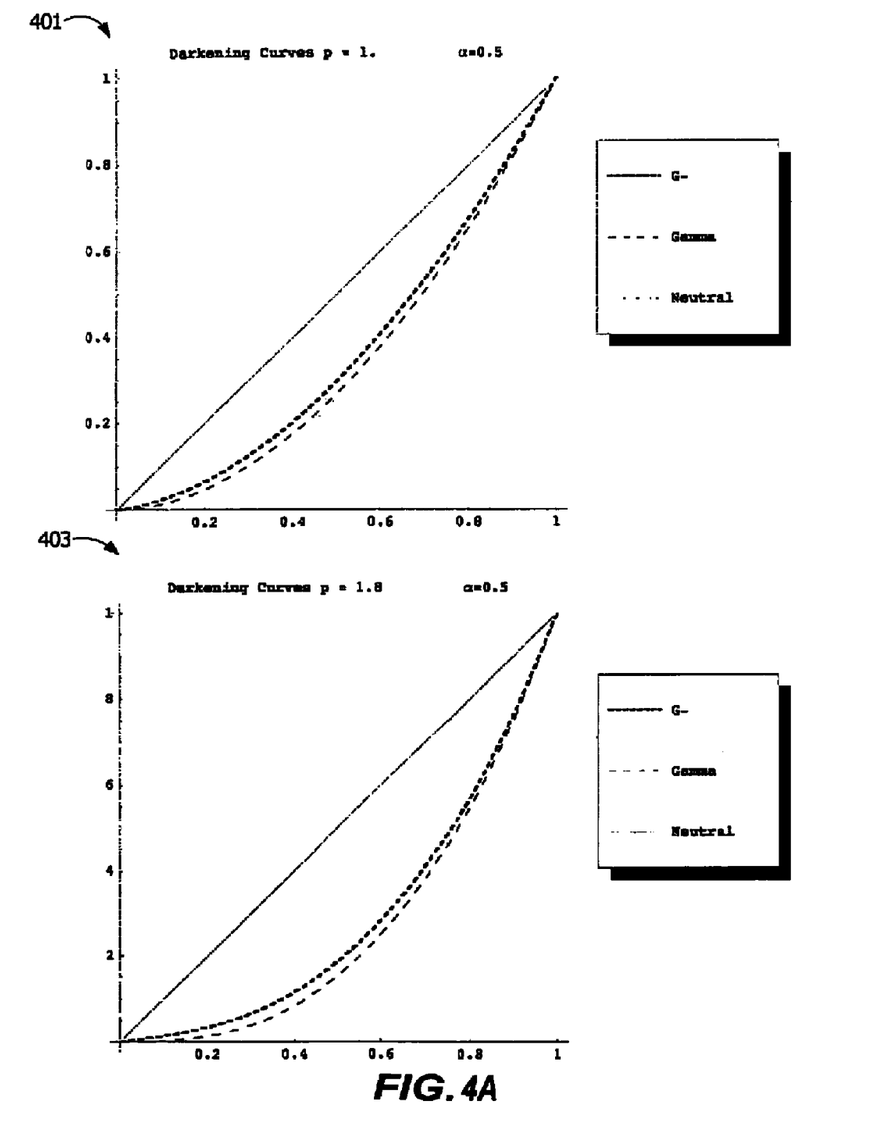
FIG. 4A are graphs that illustrate the curve generated by the inverse of the modified Gamma-like (G−) function compared to the curve generated by the inverse of a conventional Gamma-like function where p changes and $\alpha$ is held constant, according to an embodiment of the invention.

A function that is used to darken pixels is referred to herein as a "darkening function". Typically, an inverse of the Gamma-like function is used as the darkening function. For instance, FIG. 4A illustrates a graph 401 that shows a curve ("Gamma") generated by an inverse of a conventional Gamma-like function.

Disadvantages of Gamma

Unfortunately, there are many serious drawbacks to using a conventional Gamma-like function as a brightening function. One drawback is the slope of the function is infinite at the origin, which means there is a significant magnitude increase for the pixels in the darker range. Because of this increase near the origin, the Gamma-like brightening function does not distinguish well between the darker pixels, thus causing over-dramatic effects on the dark pixels. When increasing the exposure on an image, a user is typically concerned about the dark areas of the image, which happen to be the areas where a conventional Gamma-like function fails to perform well.

Conversely, the same problem exists when a user wishes to decrease exposure, or darken an image. The inverse of a conventional Gamma-like function has an infinite slope at the highest brightness value, which means the darkening function does not distinguish well between the lighter pixels. When a user wishes to darken an image, the user is typically concerned about the lighter areas of the image, which are the areas where the inverse Gamma-like function fails to perform well.

Based on the foregoing, there is room for improvement in exposure adjustment in digital imaging, particularly in brightening and darkening the appropriate areas of an image.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

An improved exposure adjustment technique is disclosed that brightens and darkens the appropriate pixels in an image whose brightness values are within a certain brightness range. A modified Gamma-like function is applied to the brightness values of each pixel in a set of pixels in a digital image. The modified Gamma-like function has a non-infinite slope at the origin and a more uniform increase across a subrange of values corresponding to the relatively dark end of the brightness spectrum compared to a conventional Gamma-like function, resulting in improved brightness enhancing properties.

Advantages of G+ Functions

The modified Gamma-like functions (hereinafter referred to as "the G+ function") possess advantageous properties for darkening images. The G+ function is part of a family of curves which are not infinite at the origin, or dark end of the brightness spectrum.

As stated above, when a user chooses to increase the exposure of an image, the user is typically interested in adjusting the darker areas of an image. But a conventional Gamma-like function, which has an infinite slope at the origin, causes the darker pixels to increase in brightness more rapidly. Because the conventional Gamma-like function does not distinguish well between darker pixels, it causes over-dramatic effects on the dark pixels. The same problem occurs when darkening an image with the inverse of the conventional Gamma-like function, except the over-dramatic effects occur on the bright pixels.

Two of the key principles in adjusting brightness are 1) it is undesirable to shift very black pixels to some other value and very white pixels to some other value and 2) it is desirable to shift everything in between as uniformly as possible. The G+ function works well because 1) it does not shift the darker too quickly, and 2) it shifts the brightness characteristic of the dark and moderately bright pixels relatively uniformly.

Brightening

Referring to FIG. 1, a graph 101 illustrates the curve generated by the G+ function compared to the curve of a conventional Gamma-like function, according to an embodiment of the invention. "Gamma" in graph 101 and in all subsequent graphs refers to the conventional Gamma-like function and "G+ " refers to the G+ function discussed above. Also, the range from zero to 1.0 on each axis represents the range of possible values for a pixel in a digital image, where 1.0 represents white and zero represents black. Parameter "p" is a brightness parameter of each function and alpha, "α", is a coefficient in the G+ function. The x-axis represents the value of a pixel before its brightness characteristic is adjusted by applying a function. The y-axis represents the value of a pixel after its brightness characteristic is adjusted by applying a function.

For example, if a pixel k has a brightness characteristic of 0.2 and the Gamma function of graph 101 (where p=1.5 and α=0.6) is applied to it, then the resulting brightness characteristic of pixel k is roughly 0.44. If the G+ function is applied to pixel k, then the resulting brightness characteristic of pixel k is roughly 0.36.

The G+ function does predictable brightness shifts to a larger range of pixels, especially for dark to moderately bright images. However, the Gamma curve "bulbs" at the darker end of the spectrum, which means the function takes subtle gradations in the dark pixels in an image and makes them unsubtle.

Graph 101 illustrates the bulbous characteristic at the darker end of the spectrum. As stated above, a user is typically interested in the darker pixels of an image when brightening the image. Therefore, the over-dramatic effects on the darker pixels produced by the Gamma function is contrary to what the typical user would want.

The difference in shape of the G+ and Gamma curves generated by their respective functions also indicates that the pairing of the G+ function with its counterpart G-function is useful for color shifts due to the relatively constant increase in brightness. In order to perform a color correction on a digital image it is necessary to smoothly decrease one color while increasing another; for example, increasing the red component while decreasing the blue component. If red is increased without a corresponding decrease in blue, the image undergoes changes in overall brightness, which is not what is desired. In addition, the color correction should be perceptually uniform across the brightness spectrum, making a color change that is consistent across darker hues, midtones, and brighter pastels. In a digital context, the correction takes place in an environment in which values are constrained to a minimum, typically zero, and a maximum, typically 255 (but dependent entirely on the number of bits assigned to each color component). In reducing the amount of blue in an image one wants to reduce it uniformly, for the most part, but neither decrease it below zero nor ordinarily reduce maximum brightness. The reason for the latter will give an idea of the reason for the former: commonly, the lightest regions of an image exceed the maximum brightness capacity of the sensor, so that red, green, and blue are all recorded as maximum values, like 255, which might be scaled to a value of 1.0. If one takes a pure white, with red, green, and blue components 1.0, 1.0, and 1.0, then attempts to increase red while decreasing blue causes a problem to emerge. First, one cannot increase red, which is already at a maximum. In addition, decreasing blue, for example by 20%, would produce both an overall reduction in brightness (a weighted sum of red, green, and blue) and a distinctly non-white hue; in this case, a mixture of red and green that a viewer will see as a pure yellow. Typically therefore one needs to alter colors in an image by leaving zero values and maximal values unchanged, making adjustments smoothly, and applying relatively balanced changes across the middle of the spectrum. The brightening and darkening curves must therefore, viewed mathematically, go through 0 and 1, be smooth, and have a shape that have a shape for which G+ and G− functions are balanced through the middle range of brightness.

Other virtues include primarily that the G+/G− functions are relatively simple to compute, comparable to Gamma without Gamma's primary drawback—infinite slope at the origin. Existing corrections to Gamma at the origin employ a straight line approximation used for small x values. Such an approximation has the drawback of requiring a logical branch to compute and the curve not being as smooth.

Another beneficial characteristic of the G+ function that relates to the bulbous characteristic described above is the slope at the origin. The G+ function has a slope that is non-infinite at the origin and lower than the slope of a Gamma function across a range of values that corresponds to lower brightness characteristics. The higher slope of the Gamma function near the origin illustrates one of the major problems of a Gamma curve where the darker pixels are not distinguished from one another. The infinite slope at the origin coupled with the higher slope near the origin of the Gamma function results in over-dramatic effects on the relatively dark areas of an image, which is what a user typically does not want when brightening an image.

According to one embodiment of the invention, a G+ function has the following characteristics. First, the G+ function includes at least two parameters, a coefficient, and a first component and a second component. The second component comprises at least a numerator and a denominator. Whenever either parameter increases, the first component increases and the second component decreases. Also, as either parameter increases, the first component increases at a rate slower than the rate of decrease of the second component, causing the slope of the curve to continuously decrease. The G+ function may also comprise a coefficient that is multiplied with the second component before the second component is added to the first component.

Figure 3A:
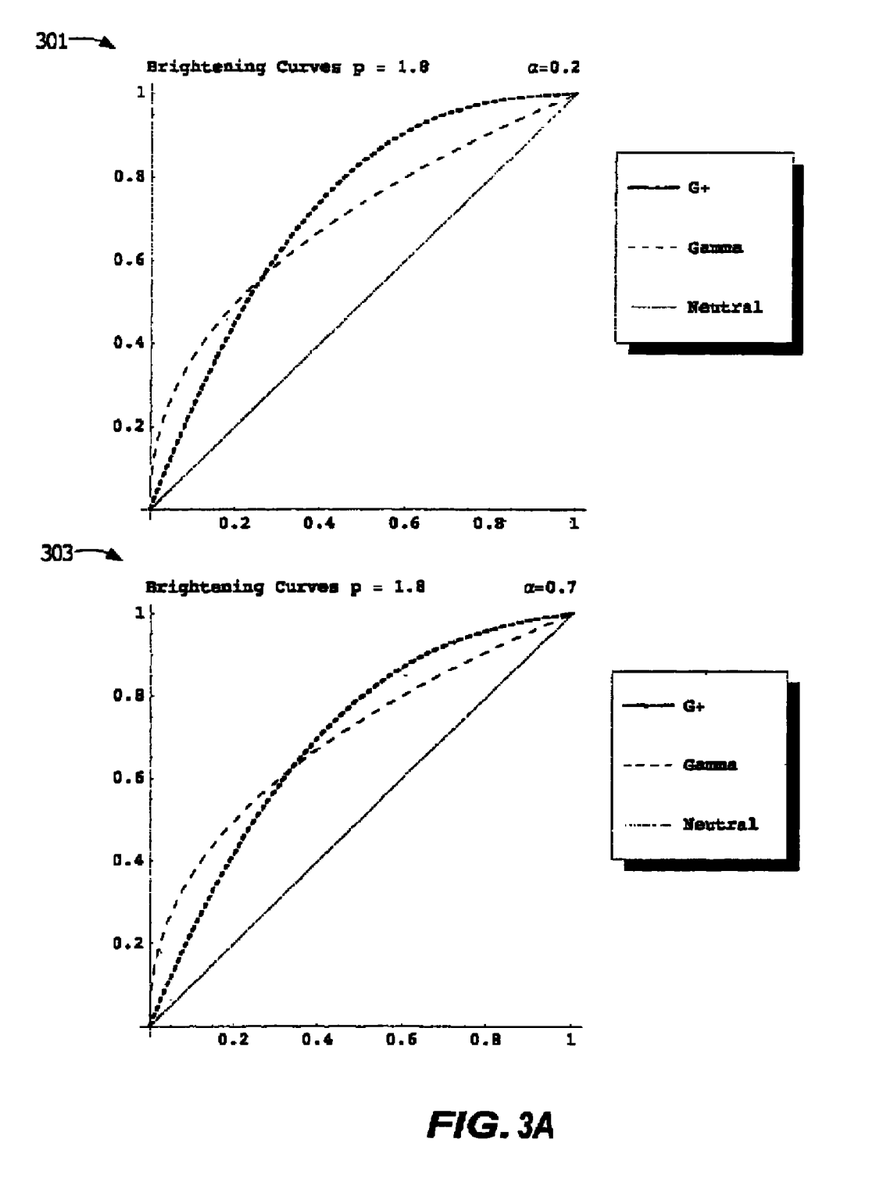
FIGS. 3A-B are graphs that illustrate the effect that changing $\alpha$ has on the shape of the curve generated by the G+ function compared to the curve generated by the conventional Gamma-like function where p is held constant, according to an embodiment of the invention.
Figure 3B:
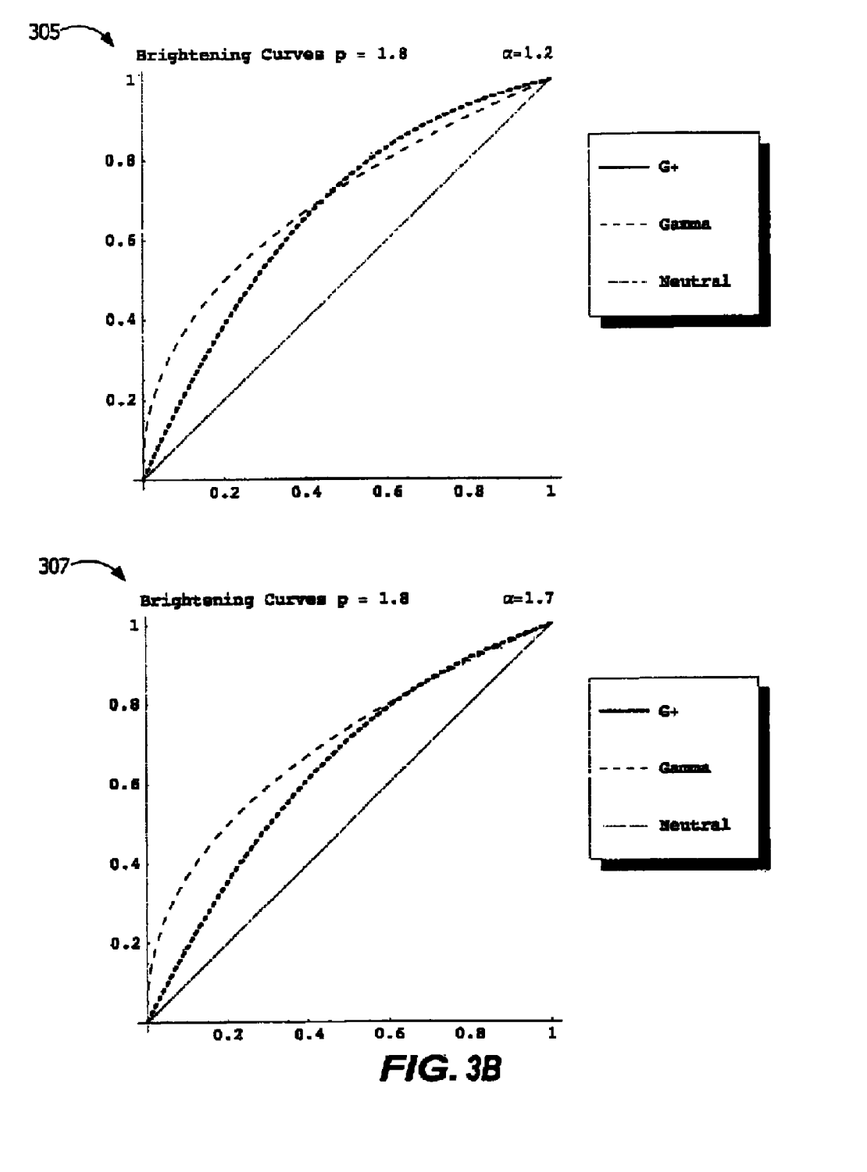

According to one embodiment of the invention, a G+ curve is generated with the following function:

$$f(x, p) = x^{p+1} + \alpha[px(1-x^2)]/(p+1)^2$$

where $f(x, p)$ returns a new brightness characteristic of a given pixel, x is the old brightness characteristic of the given pixel, p is the brightness parameter, and $\alpha$ is the slope of the function at the origin. According to one embodiment, $\alpha$ is in the range of 0.5 and 0.8 due to the beneficial characteristics of the resulting curve (see FIGS. 3A-B).

A user interface control, such as a slider, may be displayed to a user via a graphical user interface, wherein the interface control allows a user to specify a value for $\alpha$. The graphical user interface receives user input through the interface control and $\alpha$ adjusts based on the input. The brightness characteristic for each pixel in a set of pixels in a digital image are modified based on the user input. The set of pixels with modified brightness characteristics are then displayed to the user.

Figure 2A:
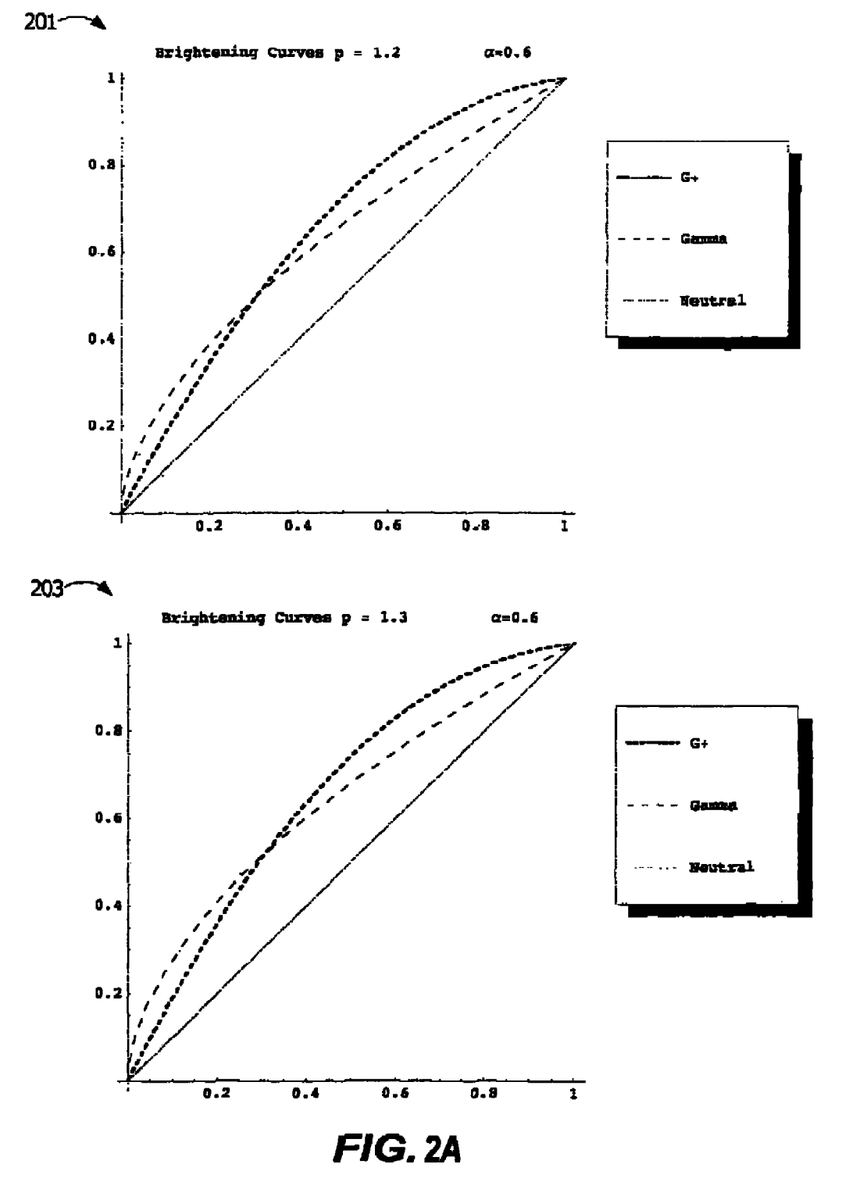
FIGS. 2A-B are graphs that illustrate the effect that changing the brightness parameter (p) has on the shape of the curve generated by the G+ function compared to the curve generated by the conventional Gamma-like function where a coefficient alpha ($\alpha$) in the G+ function is held constant, according to an embodiment of the invention.
Figure 2B:
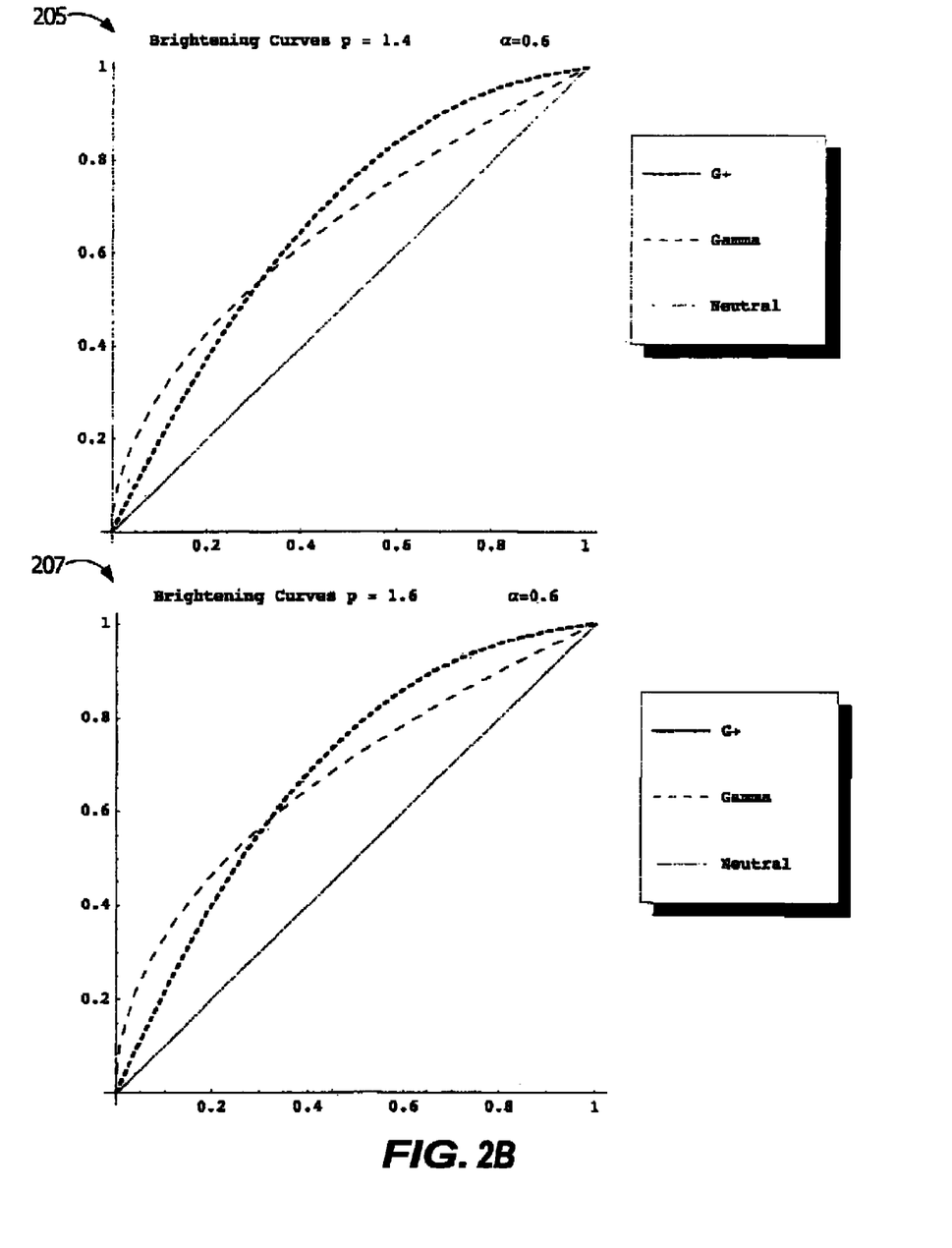

FIGS. 2A-B show graphs that illustrate the effect that changing the brightness parameter (p) has on the shape of the curve generated by the G+ function compared to the curve generated by the Gamma function where a coefficient alpha ($\alpha$) in the G+ function is held constant, according to an embodiment of the invention. As p increases, the slope of the G+ curve at the origin increases as well as the "bulge" at the lighter end of the brightness spectrum. However, the slope of the G+ curve at the origin still is not infinite despite p having the relatively high value of 1.6 in graph 207 of FIG. 2B. Compare the G+ curve of graph 207, where p is 1.6, with the Gamma curve of graph 201 of FIG. 2A, where p is 1.2. The Gamma curve still has an infinite slope at the origin and a steeper slope near the origin compared to the G+ curve.

FIGS. 3A-B show graphs that illustrate the effect that changing $\alpha$ has on the shape of the curve generated by the G+ function compared to the curve generated by the Gamma function where p is held constant, according to an embodiment of the invention. As $\alpha$ increases from 0.2 in graph 301 of FIG. 3A to 1.7 in graph 307 of FIG. 3B, the slope of the G+ curve near the origin and through the middle range of brightness values decreases. This decreasing slope reduces the relatively large bulge in the middle to upper end of the brightness spectrum, as seen in graph 301 of FIG. 3A.

According to one embodiment, a slider is displayed on a computer display, e.g., via a graphical user interface. As the user moves the slider, the brightness level changes based on the position of the slider. The brightness characteristic of each pixel in the digital image, or each pixel in a portion of the digital image selected by the user, is modified according to the output of the G+ function.

According to one embodiment, the G+ function is applied to each individual RGB value (i.e. to each red, green, and blue component of a particular pixel). Graylevel images usually have just one value associated with each pixel that represents how bright it appears on a CRT monitor or LCD screen. Thus, when the image is brightened, the G+ function is applied only once for each pixel. For color images, however, each pixel has at least three values associated with it; one of red, green, and blue. This means that the G+ function is applied three times for each pixel:

$$r' = f(r, p) = r^{p+1} + \alpha[pr(1-r^2)]/(p+1)^2;$$

$$g' = f(g, p) = g^{p+1} + \alpha[pg(1-g^2)]/(p+1)^2; \text{ and}$$

$$b' = f(b, p) = b^{p+1} + \alpha[pb(1-b^2)]/(p+1)^2$$

where r', g', and b' is the new red, green, and blue values, respectively, for a given pixel and r, g, and b are the old red, green, and blue values, respectively, for the given pixel.

Color "Faithfulness"

Physiologically speaking, the human eye is more sensitive to some colors than others. For this reason, a simple application of the G+ function to each RGB value is not completely color faithful. Therefore, in another embodiment of the invention, different weights are applied to each red, green, and blue value after calculating the new red, green, and blue values. For example, $$r' = w_1 * f(r);$$

$$g' = w_2 * f(g); \text{ and}$$

$$b' = w_3 * f(b).$$

where $w_1$, $w_2$, and $W_3$ each represent a certain weight associated with a particular color.

Another method of brightening which has even more color faithfulness may also be pursued. According to many color purists, it is better to view a pixel according to its HSL or HSI components; that is, hue, saturation, and luminosity or intensity. Therefore, according to one embodiment of the invention, the RGB value for each pixel is translated into a corresponding luminosity (L) or intensity (I) component. Hue and saturation are ignored (since they are not relevant to brightness) and only the L or I component is entered into the G+ function. Therefore, when applying the G+ function to a pixel, 1) the pixel's RGB value is translated into L or I, 2) L or I is fed into the G+ function, for example, the following function:

$$f(L, p) = L^{p+1} + \alpha[pL(1-L^2)]/(p+1)^2, \text{ and}$$

3) the new luminosity or intensity component, along with the original hue and saturation components, are translated back into a new RGB value.

Darkening

The G+ function only applies to brightening pixels in an image. Thus, it is desirable to have a corresponding function that performs well at the opposite side (i.e., the brighter side) of the brightness spectrum. Such a function is hereinafter referred to as "the G-function."

To generate an inverse Gamma curve, typical inverse Gamma functions simply reflect the Gamma curve over the line y=x. Thus, the infinite slope at the origin for Gamma functions corresponds to a zero slope at the origin for inverse Gamma functions, which results in relatively dark areas of an image becoming significantly darker.

Figure 4B:
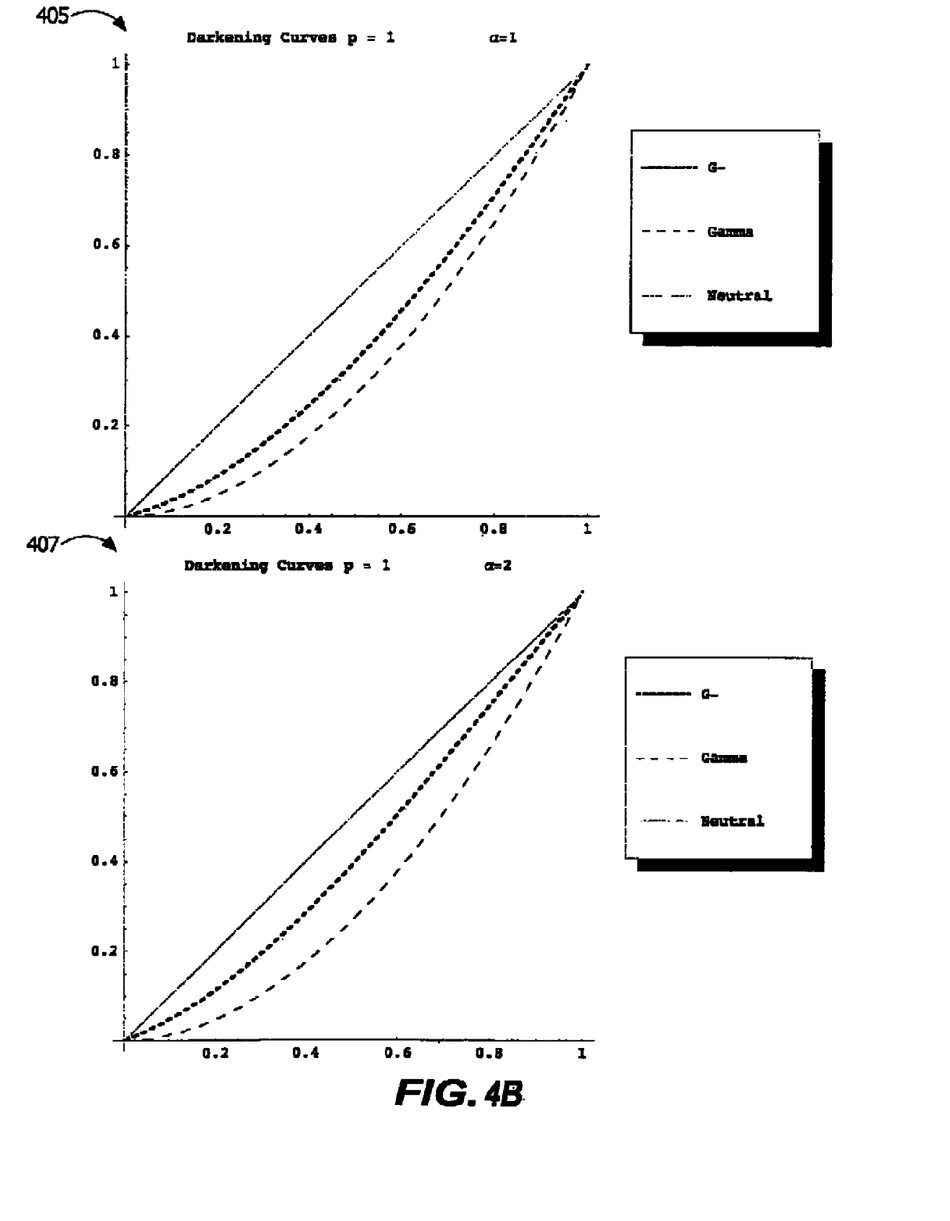
FIG. 4B are two graphs that illustrate the curve generated by the G− function compared to the curve generated by the inverse of a conventional Gamma-like function where $\alpha$ changes and p is held constant, according to an embodiment of the invention.

According to one embodiment of the invention (as depicted in FIGS. 4A-4B), the G– curve is obtained by first reflecting the G+ curve left to right (e.g., over line x=0.5) and then top to bottom (e.g., over line y=0.5). According to another embodiment, the G– curve is obtained by reflecting the G+ curve over line y=x, or algebraically obtained by taking the inverse of the G+ function. Specifically, a G– curve may be generated by the following formula:

$$g(x, P) = 1 - f(1-x, P) = 1 - \{(1-x)^{P+1} + \alpha fP(1-x)(1-(1-x)^2)\}/(P+1)^2\}.$$

FIG. 4A shows two graphs that illustrate the curve generated by the inverse of the G– function compared to the curve generated by the inverse of the Gamma function where p changes and α is held constant, according to an embodiment of the invention.

FIG. 4B shows two graphs that illustrate the curve generated by the G– function compared to the curve generated by the inverse of the Gamma function where α changes and p is held constant, according to an embodiment of the invention. The reference to "Gamma" in graphs 401-407 in FIGS. 4A-B refers to the inverse of the conventional Gamma-like function. Graphs 405 and 407 of FIG. 4B particularly illustrate the effect that α has on the G– curve. As α increases, the slope of the G– curve at the lighter end of the spectrum decreases. The "bulb" at the darker end of the spectrum also decreases as α increases.

Figure 4C:
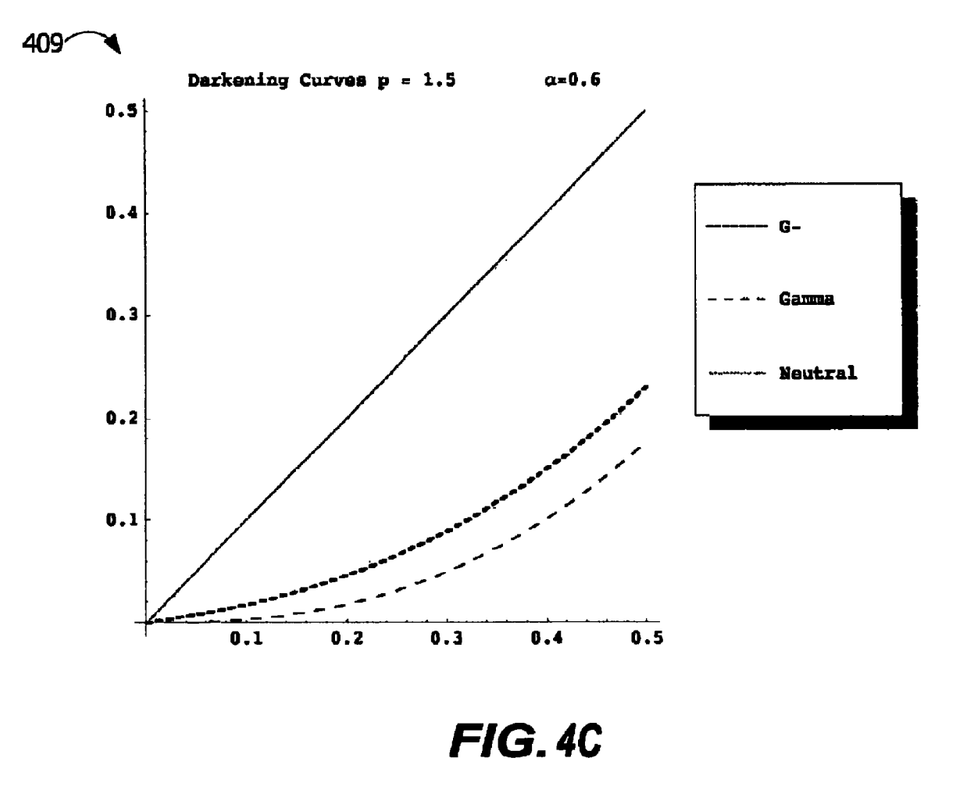
FIG. 4C is a graph that illustrates the darkening half of the curve generated by the G− function compared to the corresponding half of the curve generated by the inverse of a conventional Gamma-like function for specified values of p and $\alpha$, according to an embodiment of the invention.

FIG. 4C is a graph that illustrates the darkening half of the curve generated by the G– function compared to the corresponding half of the curve generated by the inverse of a conventional Gamma-like function for specified values of p and α, according to an embodiment of the invention.

The G– function has some advantages over the inverse Gamma function. For instance, the G– curve closely matches the inverse Gamma curve for the top 20% of brightness values (e.g., see graphs 401 and 403 of FIG. 4A), but does not at the same time "erase" the bottom 10% of values. Darkening is most often applied when the bright parts of an image are of interest, and it is preferable to obtain this darkening without excessively darkening the dark parts of the image. The G– curve makes progress compared to the inverse Gamma curve in this regard (see FIG. 4C).

According to one embodiment of the invention, the G– function is computed on each RBG value individually, and each RGB value can be weighted before a new pixel's RGB value is determined. Furthermore, according to one embodiment, the G– function operates on the luminosity or intensity component of a pixel by first translating from RGB to HSL or HSI, inserting L or I into the equation, and then translating the L or I back to a new RGB value to be displayed on a computer display device.

Hardware Overview

Figure 5:
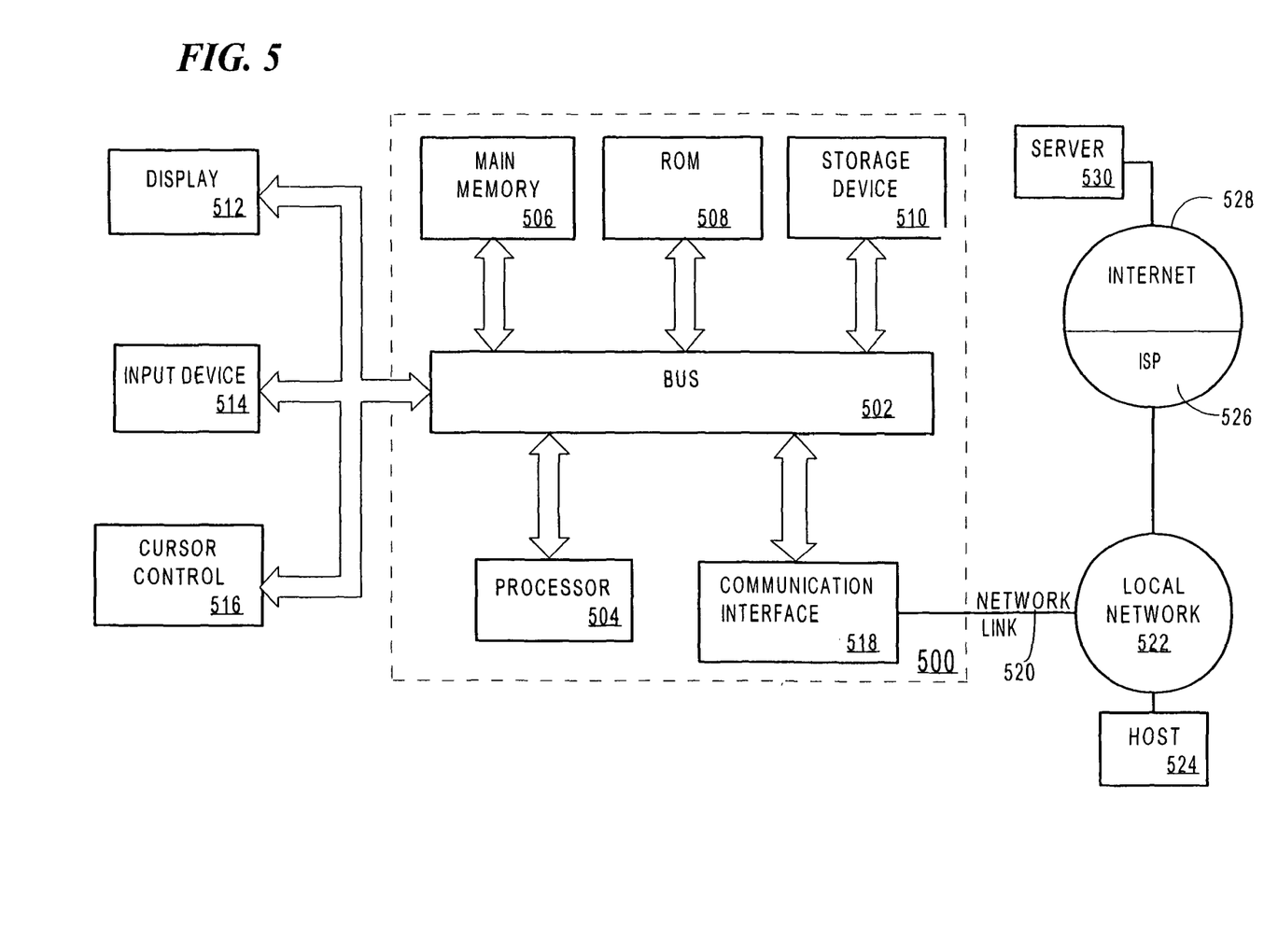
FIG. 5 is a block diagram that illustrates a computer system upon which an embodiment of the invention may be implemented.

FIG. 5 is a block diagram that illustrates a computer system 500 upon which an embodiment of the invention may be implemented. A computer system as illustrated in FIG. 5 is but one possible system on which embodiments of the invention may be implemented and practiced. For example, embodiments of the invention may be implemented on any suitably configured device, such as a handheld or otherwise portable device, a desktop device, a set-top device, a networked device, and the like, configured for containing and/or playing audio. Hence, all of the components that are illustrated and described in reference to FIG. 5 are not necessary for implementing embodiments of the invention.

Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution. In this manner, computer system 500 may obtain application code in the form of a carrier wave.

Extensions and Alternatives

Alternative embodiments of the invention are described throughout the foregoing description, and in locations that best facilitate understanding the context of such embodiments. Furthermore, the invention has been described with reference to specific embodiments thereof. It will, however, be evident that various modifications and changes may be made thereto without departing from the broader spirit and scope of the invention. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A computer-readable volatile or non-volatile storage medium storing instructions for modifying the brightness characteristics of one or more pixels of a digital image, which instructions, when executed by one or more processors, cause:

applying the following function to a set of one or more values associated with each pixel in a set of pixels:

$$f(x, p) = x^{p+1} + \alpha px(1-x^2)/(p+1)^2;$$

wherein x is the brightness characteristic of the pixel, p is the brightness parameter applied to each pixel in the set of pixels, and $\alpha$ is a value that affects the resulting brightness characteristic.

2. The computer-readable volatile or non-volatile storage medium of claim 1, wherein said instructions are instructions which, when executed by one or more processors, further cause:

displaying a user interface control that allows the user to specify a value for $\alpha$;

receiving user input through the user interface control that adjust the value of $\alpha$;

adjusting the value of $\alpha$ based on the user input;

modifying the set of one or more values associated with each pixel in the set of pixels in the image based on the function using the modified value of $\alpha$; and redisplaying the image with the modified pixel values.

3. The computer-readable volatile or non-volatile storage medium of claim 1, wherein applying the function is performed in response to receiving user input in a computer system, wherein the set of pixels is displayed on a display associated with said computer system after the user input is received.

4. The computer-readable volatile or non-volatile storage medium of claim 1, wherein said instructions are instructions which, when executed by one or more processors, further cause applying weights to each value in the set of one or more values associated with each pixel when applying said function to each pixel in the set of pixels.

5. The computer-readable volatile or non-volatile storage medium of claim 1, wherein the set of one or more values of a pixel in the set of pixels is an RGB value associated with the pixel, and wherein applying the function includes:

translating an RGB value associated with a pixel into a luminosity component;

applying the function to the luminosity component to obtain a new luminosity component; and translating the new luminosity component back into a new RGB value associated with the pixel.

6. The computer-readable volatile or non-volatile storage medium of claim 1, wherein said instructions are instructions which, when executed by one or more processors, further cause receiving input from a user, wherein the input represents a brightness level to be used as the brightness parameter in the function.

7. The computer-readable volatile or non-volatile storage medium of claim 6, wherein said instructions are instructions which, when executed by one or more processors, further cause displaying on the user interface a slider, wherein, as a user moves the slider, the brightness level changes based on the position of the slider and the brightness characteristic of each pixel in the set of pixels is modified according to the output of the function.

8. The computer-readable volatile or non-volatile storage medium of claim 1, wherein the digital image is a portion of another digital image.

9. A computer-readable volatile or non-volatile storage medium storing instructions for brightening a digital image, which instructions, when executed by one or more processors, cause:
  applying a function to a set of one or more values of each pixel in a set of pixels in the digital image,
  wherein the brightness of each pixel in the set of pixels is dictated by the set of one or more values of said each pixel;
  wherein applying the function to the set of one or more values of each pixel in the set of pixels increases the brightness of said each pixel;
  wherein said function includes at least two parameters, and a first component and a second component, said second component comprising of at least a numerator, and a denominator;
  wherein one of the two parameters reflects a brightness characteristic of a pixel in the set of pixels in the digital image;
  wherein, as said one parameter increases, the first component increases and the second component decreases;
  wherein, as said one parameter increases, the first component increases at a rate slower than the rate of decrease of the second component, causing the slope of the function to continuously decrease; and
  wherein the other of the two parameters is a brightness parameter that is applied to each pixel in the set of pixels.

10. The computer-readable volatile or non-volatile storage medium of claim 9, wherein:
  the function further comprises a coefficient; and
  the coefficient is multiplied with the second component before the second component is added to the first component.

11. The computer-readable volatile or non-volatile storage medium of claim 10, wherein said instructions are instructions which, when executed by one or more processors, further cause the one or more processors to perform the steps of:
  providing a user interface control that allows a user to specify a value for said coefficient component;
  receiving user input that adjusts the value of said coefficient component;
  adjusting the value of the coefficient component based on the user input;
  modifying the set of one or more values associated with each pixel in the set of pixels in the image based on the function using the value of the adjusted coefficient component; and
  redisplaying the image with the modified pixel values.

12. The computer-readable volatile or non-volatile storage medium of claim 9, wherein applying the function is performed in response to receiving user input in a computer system, wherein the set of pixels is displayed on a display associated with said computer system after the user input is received.

13. The computer-readable volatile or non-volatile storage medium of claim 9, wherein said instructions are instructions which, when executed by one or more processors, further cause applying weights to each value in the set of one or more values associated with each pixel when applying said function to each pixel in the set of pixels.

14. The computer-readable volatile or non-volatile storage medium of claim 9, wherein the set of one or more values of a pixel in the set of pixels is an RGB value associated with the pixel, and wherein applying the function includes:
  translating an RGB value associated with a pixel into a luminosity component;
  applying the function to the luminosity component to obtain a new luminosity component; and
  translating the new luminosity component back into a new RGB value associated with the pixel.

15. The computer-readable volatile or non-volatile storage medium of claim 9, wherein said instructions are instructions which, when executed by one or more processors, further cause receiving input from a user, wherein the input represents a brightness level to be used as the brightness parameter in the function.

16. The computer-readable volatile or non-volatile storage medium of claim 15, wherein said instructions are instructions which, when executed by one or more processors, further cause displaying on the user interface a slider, wherein, as a user moves the slider, the brightness level changes based on the position of the slider and the brightness characteristic of each pixel in the set of pixels is modified according to the output of the function.

17. The computer-readable volatile or non-volatile storage medium of claim 9, wherein the digital image is a portion of another digital image.

18. A computer-readable volatile or non-volatile storage medium storing instructions for modifying the brightness characteristics of one or more pixels of a digital image, which instructions, when executed by one or more processors, cause:
  applying the following function to a set of one or more values associated with each pixel in a set of pixels:

$g(x, p) = 1 - \{(1-x)^{p+1} + \alpha p(1-x)[1-(1-x)^2]/(p+1)^2\}$;

wherein x is the brightness characteristic of the pixel, p is the brightness parameter applied to each pixel in the set of pixels, and $\alpha$ is a value that affects the resulting brightness characteristic.

19. A machine-implemented method for modifying the brightness characteristics of one or more pixels of a digital image, comprising:
  applying the following function to a set of one or more values associated with each pixel in a set of pixels:

$g(x, p) = 1 - \{(1-x)^{p+1} + \alpha p(1-x)[1-(1-x)^2]/(p+1)^2\}$;

wherein x is the brightness characteristic of the pixel, p is the brightness parameter applied to each pixel in the set of pixels, and $\alpha$ is a value that affects the resulting brightness characteristic;
  wherein applying the function is performed by one or more computing devices.

20. The method of claim 19, wherein applying the function is performed in response to receiving user input in a computer system, wherein the set of pixels is displayed on a display associated with said computer system after the user input is received.

21. A machine-implemented method for brightening a digital image, comprising:
  applying a function to a set of one or more values associated with each pixel in a set of pixels in the digital image, wherein the brightness of each pixel in the set of pixels is dictated by the set of one or more values of said each pixel;

wherein applying the function to the set of one or more values of each pixel in the set of pixels increases the brightness of said each pixel;

wherein said function includes at least two parameters, and a first component and a second component, said second component comprising of at least a numerator, and a denominator;

wherein one of the two parameters reflects a brightness characteristic of a pixel in the set of pixels in the digital image;

wherein, as said one parameter increases, the first component increases and the second component decreases;

wherein, as said one parameter increases, the first component increases at a rate slower than the rate of decrease of the second component, causing the slope of the function to continuously decrease;

wherein applying the function is performed by one or more computing devices; and wherein the other of the two parameters is a brightness parameter that is applied to each pixel in the set of pixels.

22. The method of claim 21, wherein:

the function further comprises a coefficient; and the coefficient is multiplied with the second component before the second component is added to the first component.

23. The method of claim 22, further comprising:

providing a user interface control that allows a user to specify a value for said coefficient component;

receiving user input that adjusts the value of said coefficient component;

adjusting the value of the coefficient component based on the user input;

modifying the set of one or more values associated with each pixel in the set of pixels in the image based on the function using the value of the adjusted coefficient component; and redisplaying the image with the modified pixel values.

24. The method of claim 21, wherein applying the function is performed in response to receiving user input in a computer system, wherein the set of pixels is displayed on a display associated with said computer system after the user input is received.

25. The method of claim 21, further comprising applying weights to each value in the set of one or more values associated with each pixel when applying said function to each pixel in the set of pixels.

26. The method of claim 21, wherein the set of one or more values of a pixel in the set of pixels is an RGB value associated with the pixel, and wherein applying the function includes:

translating an RGB value associated with a pixel into a luminosity component;

applying the function to the luminosity component to obtain a new luminosity component; and translating the new luminosity component back into a new RGB value associated with the pixel.

27. The method of claim 21, further comprising receiving input from a user, wherein the input represents a brightness level to be used as the brightness parameter in the function.

28. The method of claim 27, further comprising displaying on the user interface a slider, wherein, as a user moves the slider, the brightness level changes based on the position of the slider and the brightness characteristic of each pixel in the set of pixels is modified according to the output of the function.

29. The method of claim 21, wherein the digital image is a portion of another digital image.

30. A machine-implemented method for modifying the brightness characteristics of one or more pixels of a digital image, comprising:

applying the following function to a set of one or more values associated with each pixel in a set of pixels:

$$f(x, p) = x^{p+1} + \alpha p x(1-x^2)/(p+1)^2;$$

wherein x is the brightness characteristic of the pixel, p is the brightness parameter applied to each pixel in the set of pixels, and $\alpha$ is a value that affects the resulting brightness characteristic;

wherein applying the function is performed by one or more computing devices.

* * * * *

UNITED STATES PATENT AND TRADEMARK OFFICE
CERTIFICATE OF CORRECTION

PATENT NO.         : 7,787,000 B2                                       Page 1 of 1
APPLICATION NO.    : 11/325168
DATED              : August 31, 2010
INVENTOR(S)        : Russell M. Reid It is certified that error appears in the above-identified patent and that said Letters Patent is hereby corrected as shown below:

In column 3, line 52, delete ""G+ "" and insert -- "G+" --, therefor.

Signed and Sealed this
Twenty-second Day of November, 2011

David J. Kappos
*Director of the United States Patent and Trademark Office*